United States Patent [19]
Iwano

[11] Patent Number: 5,644,423
[45] Date of Patent: Jul. 1, 1997

[54] METHOD AND DEVICE FOR OPTICAL AMPLIFICATION

[75] Inventor: Tadayuki Iwano, Tokyo, Japan

[73] Assignee: NEC Corporation, Japan

[21] Appl. No.: 615,633

[22] Filed: Mar. 13, 1996

[30] Foreign Application Priority Data

Mar. 14, 1995 [JP] Japan ........................... 7-54005

[51] Int. Cl.$^6$ ........................................... H01S 3/00
[52] U.S. Cl. .................. 359/337; 359/341; 359/133; 359/177
[58] Field of Search ........................ 359/337, 341, 359/133, 154, 176, 177

[56] References Cited

U.S. PATENT DOCUMENTS

| | | | |
|---|---|---|---|
| 5,268,786 | 12/1993 | Matsushita et al. | 359/341 |
| 5,396,360 | 3/1995 | Majima | 359/133 |
| 5,502,810 | 3/1996 | Watanabe | 359/177 |
| 5,539,570 | 7/1996 | Ushirozawa | 359/341 |

FOREIGN PATENT DOCUMENTS

| | | |
|---|---|---|
| 467396 | 7/1991 | European Pat. Off. . |
| 577036 | 6/1993 | European Pat. Off. . |

OTHER PUBLICATIONS

Patent Abstracts of Japan, vol. 95, No. 006, & JP-A-07 154368, Jun. 16, 1995.

*Primary Examiner*—Mark Hellner
*Attorney, Agent, or Firm*—Ostrolenk, Faber, Gerb & Soffen, LLP

[57] ABSTRACT

In an optical amplifying device, an optical direct amplifier (11) amplifies input optical signals subjected to wavelength division multiplexing (WDM). A beam splitter (12) splits the amplified WDM signals into two. An optical filter (13A) separates a particular optical signal from one of the two outputs of the beam splitter (12). An optoelectrical converter (14) converts the separated optical signal to a corresponding electric signal. A gain controller (15) controls the gain of the direct amplifier (11) on the basis of the electric signal output from the converter (14). The optical filter 13A may be replaced with an optical variable filter (13B) and controlled by control means when the optical signal for gain control is shut off or sharply varied in wavelength. Because the gain of the direct amplifier (14) is controlled by use of particular one of the plurality of WDM signals, the individual optical signal is controlled to a preselected level even when the number of WDM signals is changed.

4 Claims, 3 Drawing Sheets

METHOD AND DEVICE FOR OPTICAL AMPLIFICATION

BACKGROUND OF THE INVENTION

The present invention relates to a method and a device for optical amplification and, more particularly, to a method and a device for directly amplifying wavelength division multiplex (WDM) optical signals for use in an optical communication system.

Optical communication systems include a WDM communication system in which a plurality of WDM optical signals each having a particular wavelength are sent together through an optical fiber or transmission path. In this kind of system, the multiplexed optical signals are amplified by the following procedure.

The multiplexed optical signals are incident to an optical direct amplifier or amplifying medium implemented by, e.g., an erbium-doped optical fiber. The direct amplifier amplifies the incident optical signals in the form of light. The amplified optical signals are input to a beam splitter and split into two thereby. One part of the split optical signals is applied to an optoelectrical converter and transformed to an electric signal thereby. The electric signal is input to a gain controller. In response, the gain controller controls the gain of the direct amplifier such that the electric signal has a preselected level.

As stated above, it has been customary with a method and a device for optical amplification to control the gain of the optical direct amplifier such that the multiplexed optical signals have a preselected total output level. Hence, so long as the conventional device deals with a fixed number of multiplexed optical signals, it can perform accurate control over the optical output level.

However, it is difficult with the conventional device to change the preselected number of optical signals afterward. For example, when the number of optical signals to be amplified is increased, the output level of the individual signal decreases because the device controls the total optical output level to a preselected level. As a result, the individual optical signal cannot be amplified to the expected level.

In this manner, it is difficult with the conventional method and device to change the number of signals to be multiplexed, i.e., the transmission capacity after the start of operation of the system. In this sense, the system using the conventional method and device for optical amplification lacks in extendibility.

SUMMARY OF THE INVENTION

It is therefore an object of the present invention to provide a method and a device for optical amplification capable of controlling the optical output level of the individual WDM optical signal to a preselected level.

In accordance with the present invention, an optical amplifying device has an optical direct amplifier for amplifying optical signals subjected to WDM, and a beam splitter for splitting the optical signals amplified by the optical direct amplifier into two. An optical filter separates a single optical signal from one of the two outputs of the beam splitter. An optoelectrical converter outputs an electric signal corresponding to the level of the single optical signal transmitted through the optical filter. A gain controller controls the gain of the optical direct amplifier such that the electric signal output from the optoelectrical converter has a preselected level.

In a preferred embodiment of the present invention, an optical variable filter is used to separate the single optical signal from one of two outputs of said beam splitting means, and varies its transmission wavelength range in response to a control signal. The optoelectrical converter outputs an electric signal corresponding to the level of the optical signal transmitted through the optical variable filter. A transmission wavelength range varying circuit varies the center value of the transmission wavelength range of the variable filter periodically, and matches, based on the electric signal output from the optoelectrical converter, the center value to the wavelength of the single optical signal transmitted through the variable filter.

In another preferred embodiment of the present invention, a control circuit sweeps the center value over a preselected wavelength range to thereby confine the wavelength of the single optical signal in the transmission wavelength range of the variable filter.

Further, in accordance with the present invention, a method of amplifying optical signals subjected to WDM, has the steps of separating a single optical signal from a plurality of optical signals output from an optical direct amplifier, and controlling the gain of the optical direct amplifier on the basis of the level of the single optical signal.

The above method and device control the gain of the optical direct amplifier by use of the level of one of the WDM signals undergone amplification. This allows the level of the individual optical signal to be amplified to a preselected level even when the number of WDM signals is changed. Further, in the above preferred embodiments, the gain of the optical direct amplifier can be accurately controlled even when the wavelength of the optical signal fluctuates, because the center value of the transmission wavelength range of the variable filter is adjustable.

BRIEF DESCRIPTION OF THE DRAWINGS

The above and other objects, features and advantages of the present invention will become apparent from the following detailed description when taken with the accompanying drawings in which.

In the figures, the same constituent parts are designated by like reference numerals.

DETAILED DESCRIPTION OF THE PREFERRED EMBODIMENTS

Figure 1:
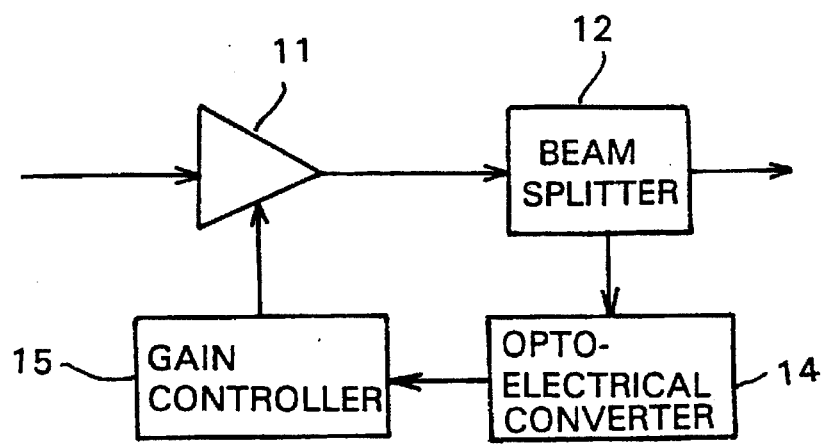
FIG. 1 is a block diagram schematically showing a conventional optical amplifying device.

To better understand the present invention, a brief reference will be made to a conventional optical amplifying device, shown in FIG. 1. As shown, WDM optical signals are amplified by an optical direct amplifier 11 and then input to a beam splitter 12. The beam splitter 12 splits the input signals into two. One part of the two outputs of the beam splitter 12 is input to an optoelectrical converter 14 and converted to an electric signal of corresponding level thereby. A gain controller 15 controls the gain of the amplifier 11 such that the electric signal output from the converter 14 has a preselected level. In this manner, the direct amplifier 11 is so controlled as to provide the WDM optical signals with a preselected output level. This brings about a problem that when the number of WDM signals increases, the output level of the individual signal decreases.

Figure 2:
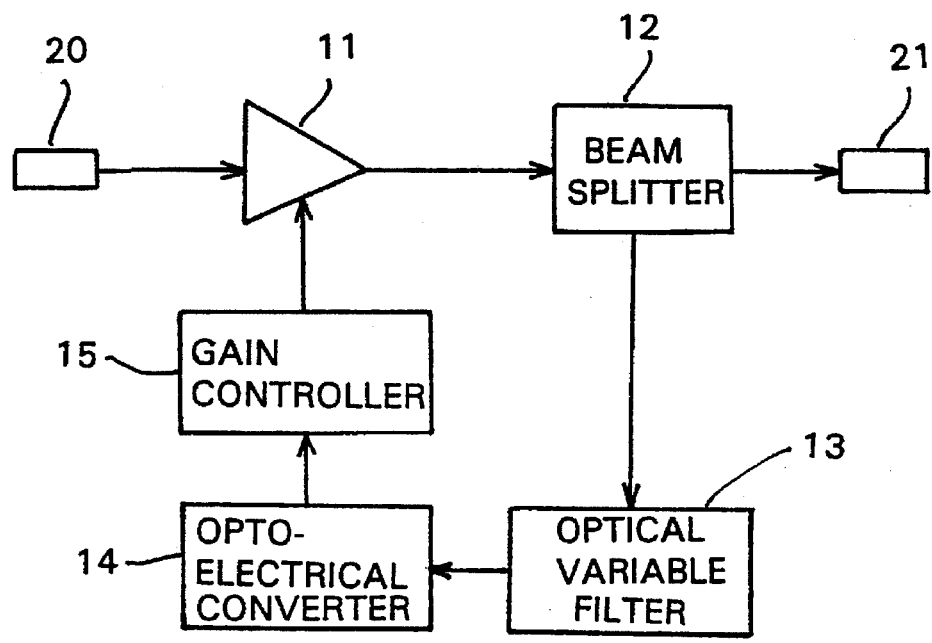
FIG. 2 is a block diagram schematically showing an optical amplifying device embodying the present invention.

An optical amplifying device embodying the present invention will be described with reference to FIG. 2. As shown, optical WDM signals are input to an optical direct amplifier 11 via an optical connector 20 and amplified in the form of light thereby. A beam splitter 12 splits the output of the amplifier 11 into two. The amplifier 11 consists of an erbium-doped optical fiber capable of amplifying a 1.55 gm band, and a semiconductor laser for excitation. The beam splitter 12 splits the input light by the ratio of 90:10. As a result, 90% of the input light is fed to an optical connector 21 while 10% of the same is fed to an optical filter 13A.

The optical filter 13A is so adjusted as to separate only one of the input optical signals which has a particular wavelength. The separated optical signal is input to an optoelectrical converter 14 which may be implemented by a photodiode by way of example. The optoelectrical converter 14 outputs an electric signal corresponding in level to the input optical signal. The electric signal is fed from the converter 14 to a gain controller 15. The gain controller 15 controls the gain of the amplifier 11 such that the electric signal has a preselected level. Specifically, to control the gain of the amplifier 11, the gain controller 15 controls the current to be injected into the semiconductor laser of the amplifier 11.

In the above arrangement, a single optical signal having a particular wavelength is separated from the WDM signals output from the amplifier 11, and the gain of the amplifier 11 is controlled such that the separated signal has a preselected level. Hence, all the WDM signals are controlled to a preselected level without regard to the number thereof.

For example, assume that two optical signals having wavelengths $\lambda 1$ (1.552 μm) and $\lambda 2$ (1.557 μm), respectively, are subjected to WDM, and that the optical filter 13A (transmission loss 3 dBm ranging from about 2 nm to about 3 nm) transmits only the signal of $\lambda 1$. Further, assume that the optical signal input to the optoelectrical converter 14 has a level of +2.45 dBm.

Under the above specific conditions, when the signal levels of the wavelengths $\lambda 1$ and $\lambda 2$ are both 0 dBm, the two WDM signals have a level of +3 dBm. The amplifier 11 amplifies such multiplexed signals to +15.45 dBm. The beam splitter 12 splits the amplified optical signals by the ratio of 90:10. One part of the outputs of the beam splitter 12 is input to the optical connector 21 with a level of +15 dBm ($\lambda 1$ and $\lambda 2$ being 12 dBm each), while the other part of the same is input to the optical filter 13 with a level of +5.45 dBm. The filter 13A transmits only the signal of $\lambda 1$ and feeds its output of +2.45 dBm to the converter 14.

Assume that optical signals having wavelengths of $\lambda 3$ and $\lambda 4$, respectively, and a level of 0 dBm are added to the above signals of $\lambda 1$ and $\lambda 2$ and input to the direct amplifier 11 as WDM signals. In this case, the multiplexed signals have a level of +6 dBm. Even in this condition, the four multiplexed signals ($\lambda 1$, $\lambda 2$, $\lambda 3$ and $\lambda 4$ each having a level of +12 dBm as in the case of the two multiplexed signals) are output with the level of +18 dBm from the optical connector 21 because the gain of the amplifier 11 is controlled on the basis of the signal of $\lambda 1$.

As stated above, the illustrative embodiment is capable of controlling the level of the individual optical signal to a preselected level without regard to the number of optical signals to be multiplexed.

Figure 3:
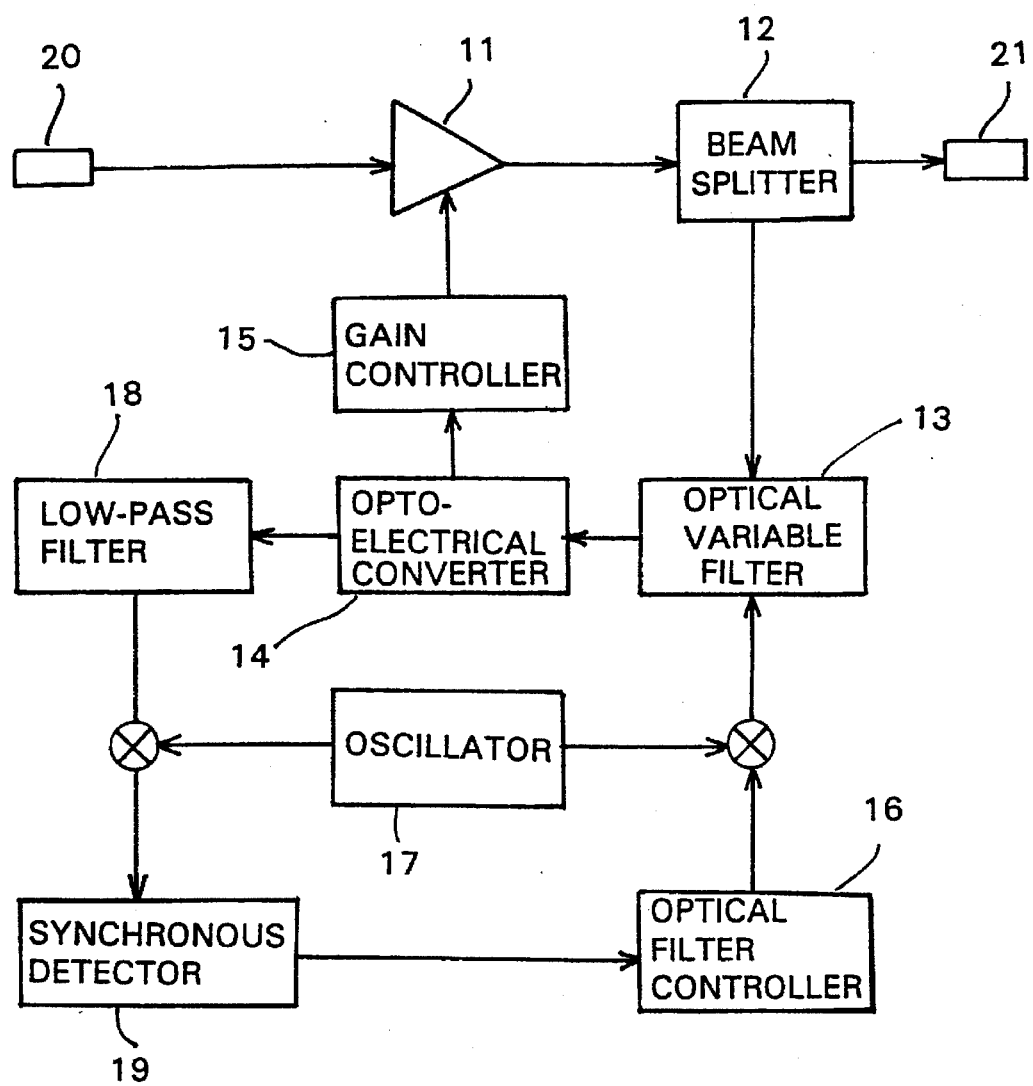
FIG. 3 is a schematic block diagram showing an alternative embodiment of the present invention.

Referring to FIG. 3, an alternative embodiment of the present invention will be described. If the wavelength of the single optical signal, or monitor light, slightly fluctuates, the level of the optical signal input to the optoelectrical converter 14 will fluctuate and will result in inaccurate gain control. The embodiment to be described includes a measure against such an occurrence.

As shown in FIG. 3, this embodiment has an optical filter implemented as an optical variable filter 13B. The variable filter 13B has a laminate interference film made up of a plurality of dielectric films. The angle of the interference film relative to incident light is variable in order to vary the center value of the transmission wavelength range of the filter 13B An optical filter controller 16 is connected to the variable filter 13B and outputs a signal for controlling the center value of the transmission wavelength range of the filter 13B. An oscillator 17 outputs a low frequency signal (e.g. about 100 Hz). The output of the oscillator 17 is superposed on the signal output from the filter controller 16.

The signal output from the filter controller 16 defines the time mean of the center value of the transmission wavelength range of the variable filter 13B. The filter 13B is controlled by the outputs of the filter controller 16 and oscillator 17 such that its transmission wavelength range delicately varies with a certain wavelength as the center (in order to prevent the wavelength of light being transmitted from missing the transmission wavelength range as far as possible).

The transmittance of an optical filter is maximum at the center of the transmission wavelength range. Hence, the optical signal incident to the optoelectrical converter 14 for gain control varies in level with a variation in the transmission wavelength range of the variable filter 13B. As a result, the electric signal output from the converter 14 varies in level with a variation in the level of the optical signal. By estimating the shape of the time-varying pattern of the above electric signal, it is possible to determine the distance between the wavelength of the optical signal being separated and the center wavelength of the transmission wavelength range, and therefore to match the center of the above range to the wavelength of the optical signal.

The device shown in FIG. 3 further includes a low-pass filter (LPF) 18 and a synchronous detector 19. The LPF 18 separates only a time-varying component from the output of the optoelectrical converter 14. The synchronous detector 19 detects the output signal of the LPF 18 synchronously in response to the low-frequency signal output from the oscillator 17.

The synchronous detector 19 produces an error signal representative of the distance between the wavelength of the detected optical signal and the center value of the transmission wavelength range. On receiving the error signal, the filter controller 16 outputs a control signal which reduces the error signal to zero, thereby matching the center value of the transmission wavelength range to the wavelength of the optical signal.

The optical signal for gain control varies its center wavelength delicately, depending on various conditions. Therefore, the variable filter 13B should preferably be continuously subjected to the above control throughout the operation of the amplifying device.

Figure 4:
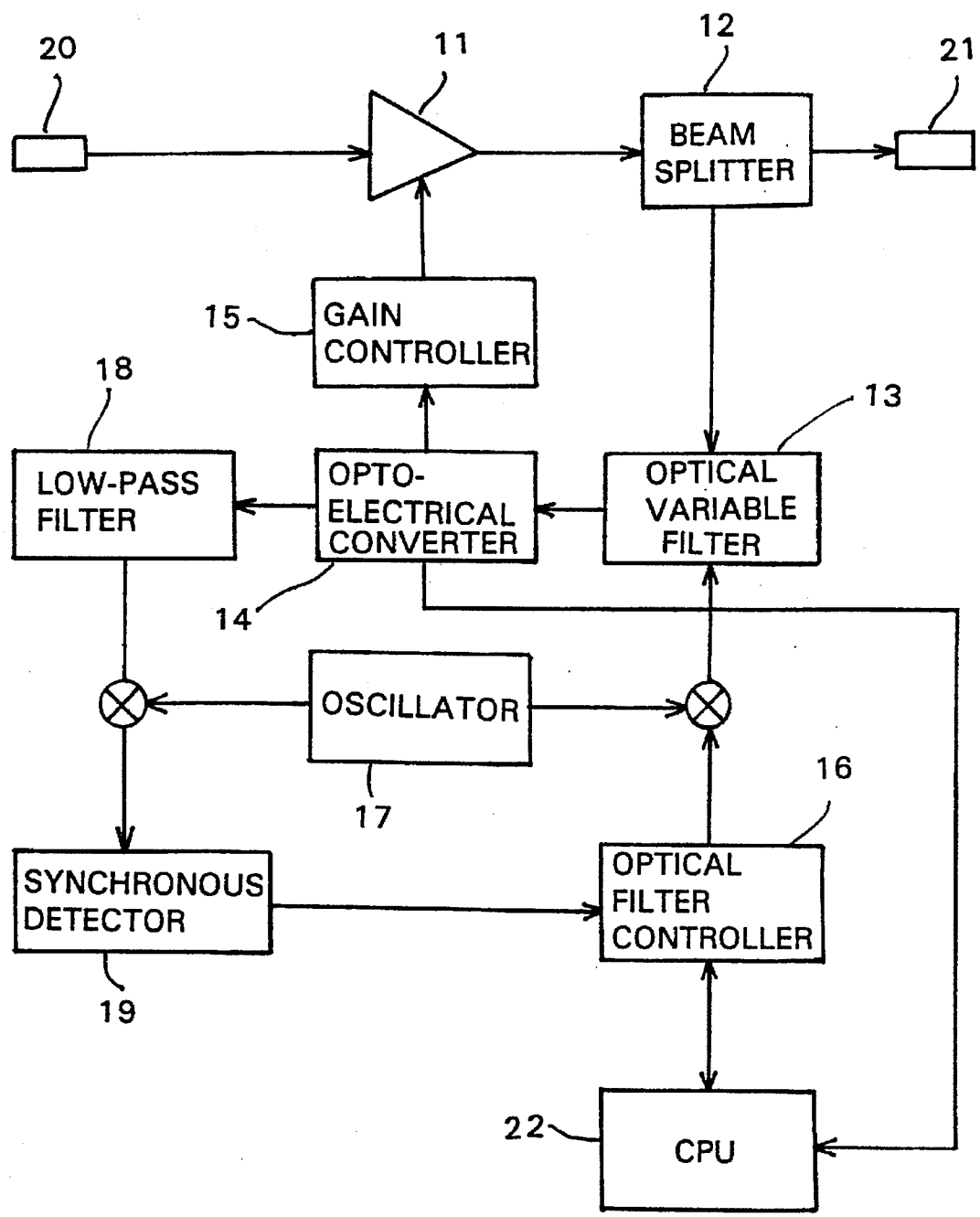
FIG. 4 is a schematic block diagram showing another alternative embodiment of the present invention.

FIG. 4 shows another alternative embodiment of the present invention. As shown, the embodiment includes a CPU (Central Processing Unit) 22. The CPU 22 controls the optical filter controller 16 such that the amplifying device performs the following operation.

First, the CPU 22 executes a control for selecting the optical signal to be used for gain control. The optical signal may be selected beforehand or at the time of the start-up of the amplifying device. When the amplifying device is started up, the CPU 22 sends a command to the filter controller 16. In response, the filter controller 16 causes the center of the transmission wavelength range of the variable filter 13B to continuously sweep the wavelength range including the wavelengths of the multiplexed optical signals, e.g., from the short wavelength side to the long wavelength side. While the continuous sweep is under way, the CPU 22 monitors the time-varying output of the optoelectrical converter 14. On detecting the peak of the optical signals, the CPU 22 sends a command to the filter controller 16 for causing it to start the previously stated gain control and transmission wavelength range control by using the transmission wavelength range, which contains peak of the optical signals, as the initial value.

Further, the CPU 22 monitors the output of the converter 14. When the output of the converter 14 sharply falls, e.g., when the optical signal having been transmitted through the filter 13B is shut off, the CPU 22 causes the gain controller 15 to stop controlling the gain of the direct amplifier 11. Subsequently, the CPU 22 sends the previously mentioned command to the filter controller 16 for the continuous sweep of the center of the transmission wavelength range of the variable filter 13B, thereby detecting the range in which the peak appears. This is followed by the gain control and transmission wavelength range control using the detected range as the initial value.

In the above embodiments, the direct amplifier 11 is implemented by an erbium-doped optical fiber. Alternatively, use may be made of an optical fiber doped with, e.g., neodymium or praseodymium. The direct amplifier 11 may even be implemented as a semiconductor laser amplifier, if desired.

In summary, in accordance with the present invention, an optical amplifying device controls the gain of an optical direct amplifier by use of the level of one of a plurality of optical WDM signals undergone amplification. Hence, the device is capable of controlling the level of the individual optical signal to a preselected level even when the number of optical signals is changed. This realizes a highly extendible system which allows the number of optical signals to be multiplexed increased or decreased, as desired.

The device includes an optical variable filter and means for matching the center of the transmission wavelength range of the filter to the wavelength of the optical signal to be used for gain control. Hence, the device is capable of executing accurate gain control even when the wavelength of the optical signal fluctuates.

Moreover, the device is capable of automatically continuing the gain control even when the optical signal for gain control is shut off or sharply varied.

While the present invention has been described in connection with certain preferred embodiments, it is to be understood that the subject matter encompassed by the present invention is not limited to those specific embodiments. On the contrary, it is intended to include all the alternatives, modifications, and equivalents as can be included within the spirit and scope of the following claims.

I claim:

1. An optical amplifying device comprising: an optical direct amplifier for amplifying optical signals subjected to wavelength division multiplexing;

beam splitting means for splitting the optical signals amplified by said optical direct amplifier into two;

an optical variable filter for separating a single optical signal from one of two outputs of said beam splitting means, and varying a center value of a transmission wavelength range of said optical variable filter in response to a control signal;

optoelectrical converting means for outputting an electric signal corresponding to a level of said single optical signal transmitted through said optical variable filter;

gain control means for controlling a gain of said optical direct amplifier such that said electric signal output from said optoelectrical converting means has a preselected level; and transmission wavelength range varying means for varying a center value of said transmission wavelength range of said optical variable filter periodically, and matching, based on said electric signal output from said optoelectrical converting means, said center value to a wavelength of said single optical signal transmitted through said optical variable filter.

2. An optical amplifying device comprising:

an optical direct amplifier for amplifying optical signals subjected to wavelength division multiplexing;

beam splitting means for splitting the optical signals amplified by said optical direct amplifier into two;

an optical variable filter for separating a single optical signal from one of two outputs of said beam splitting means, and varying a center value of a transmission wavelength range of said optical variable filter in response to a control signal;

optoelectrical converting means for outputting an electric signal corresponding to a level of said single optical signal transmitted through said optical variable filter;

gain control means for controlling said optical direct amplifier such that said electric signal output from said optoelectrical converting means has a preselected level;

transmission wavelength range varying means for varying a center value of said transmission wavelength range of said optical variable filter periodically, and matching, based on said electric signal output from said optoelectrical converting means, said center value to a wavelength of said single optical signal transmitted through said optical variable filter; and control means for sweeping said center value over a preselected wavelength range to thereby confine a wavelength of said single optical signal in said transmission wavelength range.

3. An optical amplifying device as claimed in claim 1, wherein said transmission wavelength range varying means comprises:

an optical filter controller for outputting an optical filter control signal;

an oscillator;

a low-pass filter connected to said optoelectrical converting means; and a synchronous detector for synchronously detecting a signal separated by said low-pass filter, and applying an output of said synchronous detector to said optical filter controller.

4. An optical amplifying device as claimed in claim 2, wherein said transmission wavelength range varying means comprises:

an optical filter controller for outputting an optical filter control signal;

an oscillator;

a low-pass filter connected to said optoelectrical converting means; and a synchronous detector for synchronously detecting a signal separated by said low-pass filter, and applying an output of said synchronous detector to said optical filter controller.

* * * * *